United States Patent
Sugikawa et al.

[11] Patent Number: 6,111,570
[45] Date of Patent: Aug. 29, 2000

[54] COMMUNICATION CONTROL APPARATUS AND METHOD

[75] Inventors: Akihiko Sugikawa, Osaka-fu; Yasuhiro Morioka, Hyogo-ken; Shinya Murai, Osaka-fu, all of Japan

[73] Assignee: Kabushiki Kaisha Toshiba, Kawasaki, Japan

[21] Appl. No.: 09/017,213

[22] Filed: Feb. 2, 1998

[30] Foreign Application Priority Data

Feb. 20, 1997 [JP] Japan ................................. 9-036675

[51] Int. Cl.[7] ....................................... G06F 3/00
[52] U.S. Cl. ..................... 345/329; 345/330; 345/331; 707/10; 709/205; 709/209
[58] Field of Search .................. 345/329–331; 709/201, 203, 205, 217, 219; 707/10, 501

[56] References Cited

U.S. PATENT DOCUMENTS

| | | | |
|---|---|---|---|
| 5,664,126 | 9/1997 | Hirakawa et al. | 345/331 |
| 5,864,854 | 1/1999 | Boyle | 707/10 |

OTHER PUBLICATIONS

H. Mizuno, et al., "A Multimedia Groupware System integrating DTC with VOD and WWW", IPSJ SIG Notes 96–GW–18, Jun. 14, 1996, pp. 49–54.

R. Murakami, "Mosaic wo puroguramu de kontoro–ru siyou (kouhen)", Gijutsu Hyoron Co. Ltd., Software Design, Oct. 1995, pp. 84–91.

*Primary Examiner*—Raymond J. Bayerl
*Assistant Examiner*—Sy D. Luu
*Attorney, Agent, or Firm*—Oblon, Spivak, McClelland, Maier & Neustadt, P.C.

[57] ABSTRACT

In the present invention, a plurality of the communication control apparatus form a group to communicate each other. In each communication control apparatus, a memory section stores at least one data and its discrimination information. When the discrimination information of data to broadcast is inputted through an input section, a retrieval section retrieves the data corresponding to the discrimination information from the memory section. A sending section broadcasts the retrieved data to other communication control apparatuses of the group. A receiving section receives the data broadcasted by other communication control apparatus of the group.

10 Claims, 14 Drawing Sheets

COMMUNICATION CONTROL APPARATUS AND METHOD

FIELD OF THE INVENTION

The present invention relates to a communication control apparatus and a method to broadcast data such as hypertext to other communication control apparatuses of a group.

BACKGROUND OF THE INVENTION

By development of the WWW (World Wide Web), a system of WWW is widely used in LANs ("Local Area Networks") is called an of a company. A user can access information stored in a WWW server by giving a specified URL (Uniform Resource Locator) through a WWW the browser. The information displayed by browser includes link data to resource and screen layout data and it is described by HTML (Hyper Text Makeup Language). An HTML document must be described by a special grammar and the user cannot create the document easily. However, recently, the HTML document is created by converting a document file through a format conversion means.

Data transmission between WWW server and WWW browser as a client is controlled by HTTP (Hyper Text Transfer Protocol). When the browser requests the server to transmit the HTML document, the browser sets a communication session to the server. Then, the browser sends an identifier (data discrimination information) and data transmission request to the server. After the browser receives the data from the server, the communication session is completed. The browser stores the data in memory section (Hard Disk). Hereafter, when the data is requested by the user, the browser directly accesses the data from the memory section. In short, the browser includes a cache memory function to raise the data presentation speed. Furthermore, even if the communication session is not linked to the browser, the server can repeatedly access the data from the memory section.

In case a plurality of users commonly work through each terminal while the document is displayed on each terminal, a technique for each terminal to efficiently support the work of the users is explained. In the support system to share the document among the plurality of users, the document indicated by one user (one terminal) is sent to other users (other terminals) by a communication control section. In the other terminals, received data is displayed to inform to the user. Furthermore, if the data shared in the plurality of terminals is changed, the change data is transmitted among the plurality of terminals. In each terminal, the sharing data is updated at realtime.

Each terminal includes a group-communication control section. The group-communication control section of one terminal sets communication session (link) to at least two terminals. By broadcasting function, the data is sent to the linked other terminals in one time. If all terminals are connected to same communication system (coaxial cable, wireless of same frequency), the data (packet) is sent to all terminals as destination. In each terminal, a received packet is analyzed. If a group-identifier of the packet coincides with a group-identifier to which the terminal belongs, the received packet is processed. In this method, the data is transmitted to the specified plurality of terminals at the same time. In comparison with a method to respectively send the data to each terminal, processing time is greatly reduced.

Figure 1:
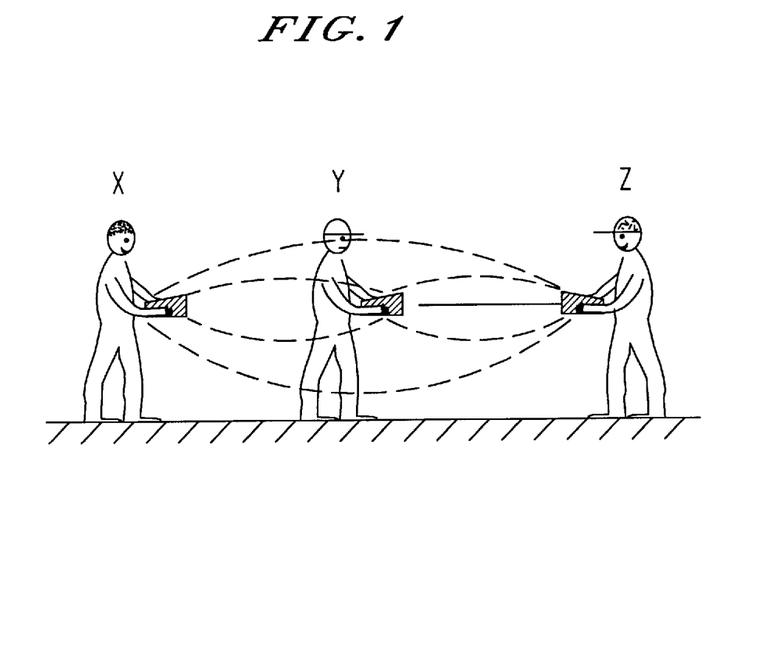
FIG. 1 is a schematic diagram of three terminals to communicate with each other by a network.
Figure 2:
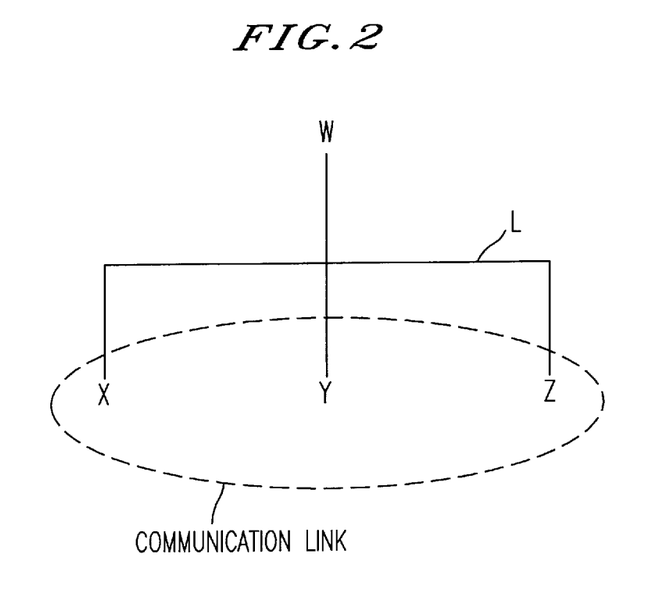
FIG. 2 is a schematic diagram of three terminals and the server to transmit the data.

As mentioned above, in proportion to development of the system such as WWW in company, sharing of HTML documents in realtime is desired. One prior method of sharing of HTML documents in a plurality of terminals is explained in detail. As shown in FIG. 1, assume that three users X, Y, Z respectively have a terminal (communication control apparatus). These three terminals are linked to each other. Therefore, the three users X, Y, Z can communicate through each terminal. As shown in FIG. 2, three terminals X, Y, Z and WWW server W are connected to a network L. In a program of each terminal, a browser process and a data sharing process are included. Assume that the user X requests new hyper text to the browser W by indicating URL of the hypertext. In this case, a communication session is set between the terminal X and the server W. The server W retrieves the hypertext from its memory (not shown in FIG. 2) by using URL and transmits the hypertext to the browser of terminal X. When the browser of terminal X receives the hypertext, the communication session to the server W is completed. At the same time, in the terminal X, the obtaining of the message of the hypertext of the URL is informed to the data sharing process through DDE (Dynamic Data Exchange) as a communication means between processes. The hypertext data is stored in the memory section of the terminal X and analyzed. Then, screen data is created from the hypertext data and displayed in the terminal X. The data sharing process in the terminal X obtains URL as hypertext discrimination information from information of process communication, creates a packet consisting of the hypertext sharing order and the hypertext discrimination information, and broadcasts the packet to the terminals Y, Z. On the other hand, the data sharing process in the terminals Y, Z analyzes the received packet, obtains the hypertext sharing order and URL, and supplies the hypertext obtaining indication to the browser process. The browser requests the server W to obtain the hypertext according to the URL. After obtaining the hypertext, the hypertext is displayed. If an arbitrary terminal of the terminals X, Y, Z has the hypertext in its memory section, the arbitrary terminal processes the hypertext without request for the server W. If the server W does not exist not inside a company as INTERNET but outside as INTERNET, as an INTRANET, but outside as an INTERNET server, a groupware Proxy server is used in the INTRANET. After receiving the hypertext sharing order, the browser in the terminal connects to the groupware Proxy server. The. Proxy server obtains the indicated data from the server W and supplies the obtained data to the terminal. Therefore, in each terminal, the time from request for data to display the data is reduced. However, in the prior art, the following three problems occur.

(1) All browsers in all terminals are not always connected to the WWW server or the groupware Proxy server. A situation that a terminal can not access the data occurs. The reason for this is that the number of terminals to simultaneously connect is limited or a connection request from the terminal is rejected according to the situation.

(2) Performance of the WWW server and the groupware Proxy server falls. The reason for this is that each terminal simultaneously requests the data to the WWW server or the groupware Proxy server.

(3) The time from request for data to display the data increases in proportion to number of terminals. The reason for this is that the browser of each terminal respectively obtains the data from the WWW server. For example, in the case of N existing terminals, data is transmitted at N-times. A response time falls in proportion to the number of terminals sharing the data.

SUMMARY OF THE INVENTION

It is an object of the present invention to provide a communication control apparatus and a method for each terminal to reduce the time from request for hypertext sharing to display the hypertext data without load to the WWW server.

According to the present invention, there is provided a communication control apparatus, a plurality of the communication with control apparatus form a group to communicate each other, comprising: memory means for storing at least one data and its discrimination information; input means for inputting the discrimination information of data to broadcast to other communication control apparatuses of the group; retrieval means for retrieving the data corresponding to the discrimination information from said memory means; sending means for broadcasting the retrieved data to other communication control apparatuses of the group; and receiving means for receiving the data broadcasted by other communication control apparatus of the group.

Further in accordance with the present invention, there is also provided a communication control method in an apparatus, a plurality of the apparatuses form a group to communicate each other, comprising the steps of: storing at least one data and its discrimination information;

inputting the discrimination information of data to broadcast to other apparatuses of the group; retrieving the data corresponding to the discrimination information from stored data; broadcasting the retrieved data to other apparatuses of the group; and receiving the data broadcasted by other apparatuses of the group.

Further in accordance with the present invention, there is also provided a computer readable memory containing computer readable instructions in an apparatus, a plurality of the apparatuses form a group to communicate with each other, comprising: instruction means for causing a computer to store at least one data and its discrimination information; instruction means for causing a computer to input the discrimination information of data to broadcast to other apparatuses of the group; instruction means for causing a computer to retrieve the data corresponding to the discrimination information from stored data; instruction means for causing a computer to broadcast the retrieved data to other apparatuses of the group; and instruction means for causing a computer to receive the data broadcasted by other apparatuses of the group.

DETAILED DESCRIPTION OF THE PREFERRED EMBODIMENT

Figure 3:
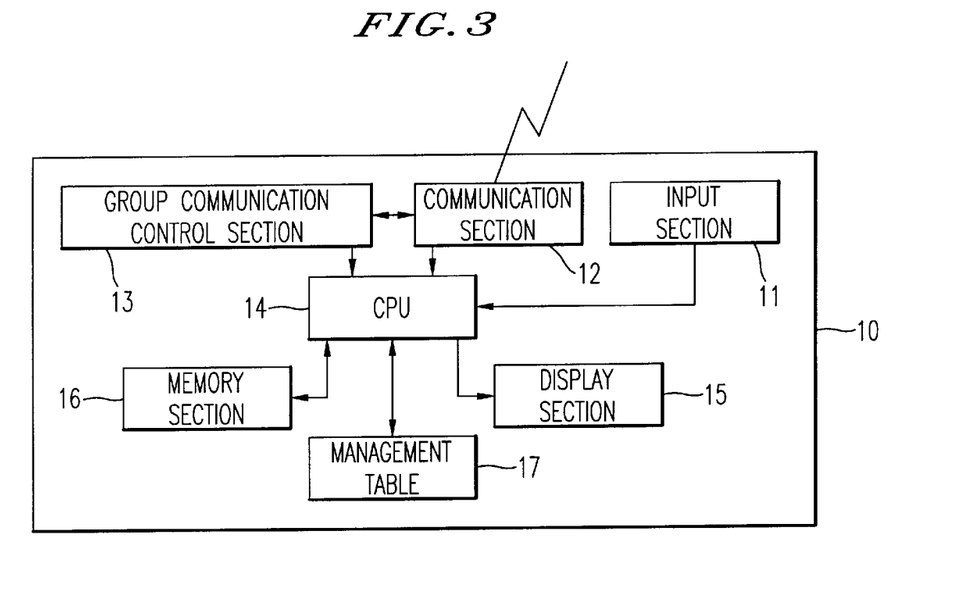
FIG. 3 is a block diagram of the communication control apparatus according to the present invention.
Figure 4:
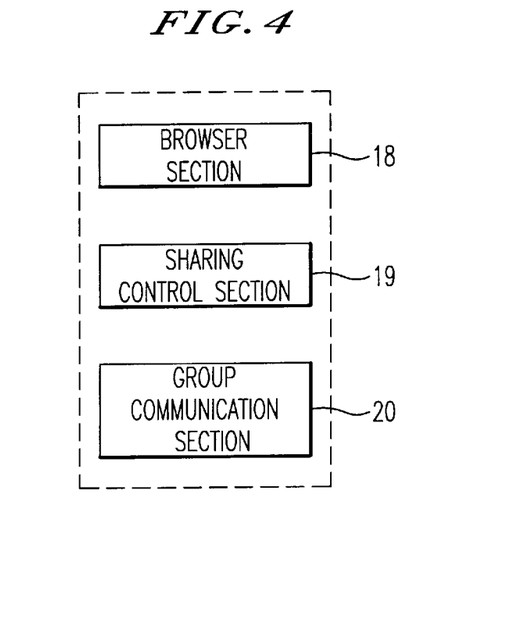
FIG. 4 is a block diagram of a program in the communication control apparatus according to the present invention.

FIG. 3 is a block diagram of the communication control apparatus (each terminal) according to a first embodiment of the present invention. The communication control apparatus 10 of the first embodiment comprises an input section 11, a communication section 12, a group communication control section 13, a CPU 14, a display section 15, a memory section 16, and a management table 17. The communication control apparatus 10 corresponds to the terminals X, Y, Z in FIG. 1 and 2. In FIG. 3, the input section 11 may be, for example a keyboard, a mouse or a joystick. The communication section 12 is, for example, a wired LAN card, serial communication, USB, IEEE 1394 using cable, or wireless LAN card, infrared rays communication, IrDA, or PHS data communication not using cable. The group communication control section 13 sends a packet to which a group identifier (group-discrimination information) is added to other terminals linked by a particular terminal through the communication section 12. If the communication section 12 receives the packet sent by the other terminal, the group communication control section 13 processes the packet whose group identifier coinidides with the particular terminal. The CPU 14 controls other sections connected by a bus. The display section 15 is realized, for example by video memory, AD conversion section, CRT, or a liquid display apparatus. The memory section 16 is, for example, RAM, or harddisk to temporarily store the data. The management table 17 stores correspondence between memory addresses in the memory section 16 and URL (Hyper text discrimination information). FIG. 4 is a block diagram of a program in the communication control apparatus 10 according to the first embodiment. As shown in FIG. 4, the program comprises a browser section 18, a sharing control section 19, and a group communication section 20. As a realized situation, the following three cases are considered.

(1) Each section is comprised by a program which activates by unit. By using process communication between programs, data and control messages are exchanged between the programs.

(2) Each section is comprised by a module, for example, a sub-routine program.

(3) The browser section 18 is one process. The sharing control section 19 and the group communication section 20 are respectively one module, and these two modules comprise one process.

The browser section 18 obtains the hypertext data from a Web server by HTTP, analyzes the HTML document, creates the data to display and controls the accessed hypertext data. As an example to realize the function, a NetScape browser is used as the process. The NetScape browser includes a process communication function except for the browser function. As another situation, ocx as module is used by sub-routine. In the first embodiment, the browser section 18 corresponds to one process, and the sharing control section 19 and the group communication section 20 corresponds to one process (data sharing process).

Figure 5A:
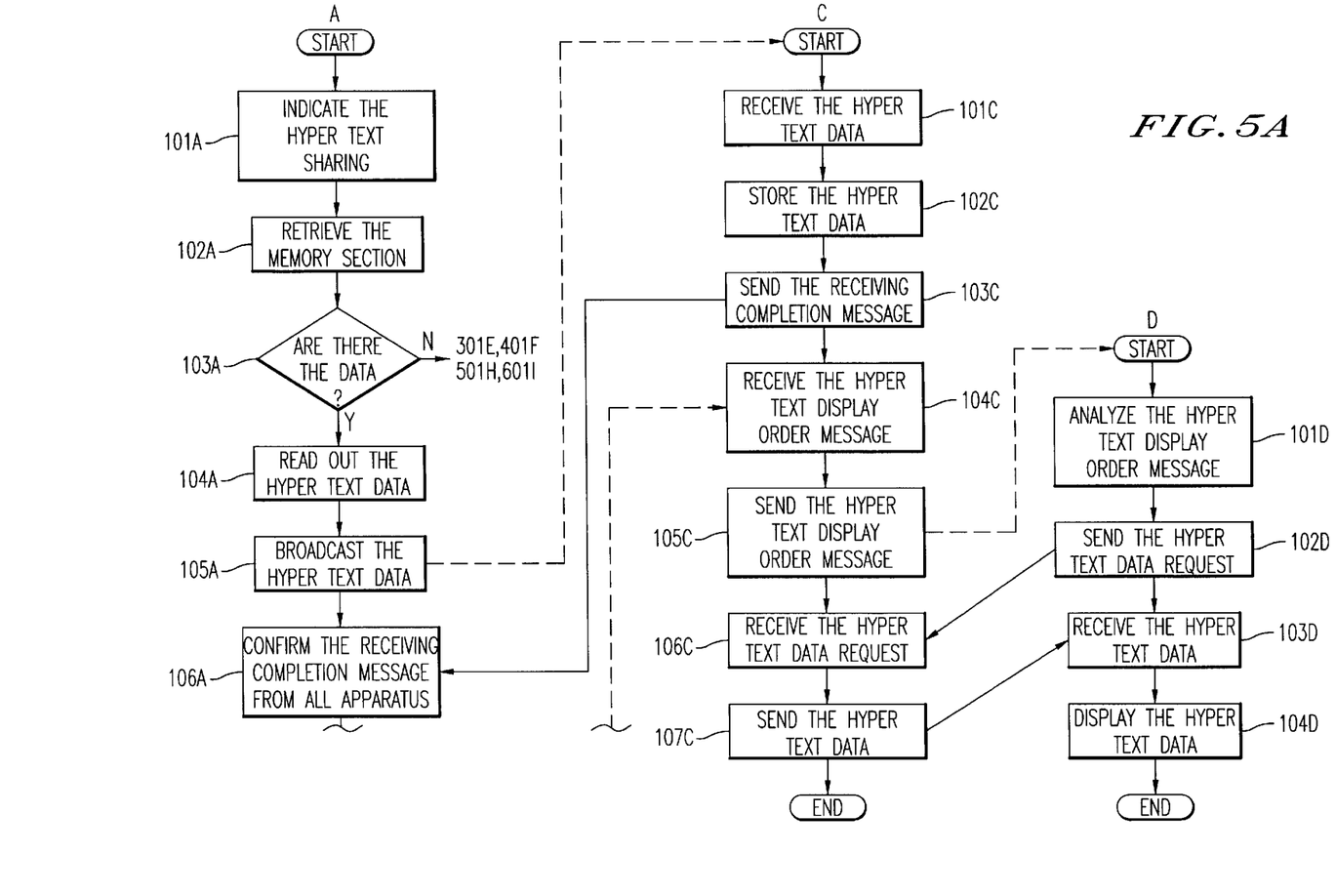
FIG. 5 is a first flow chart of a communication control method according to a first embodiment of the present invention.
Figure 5B:
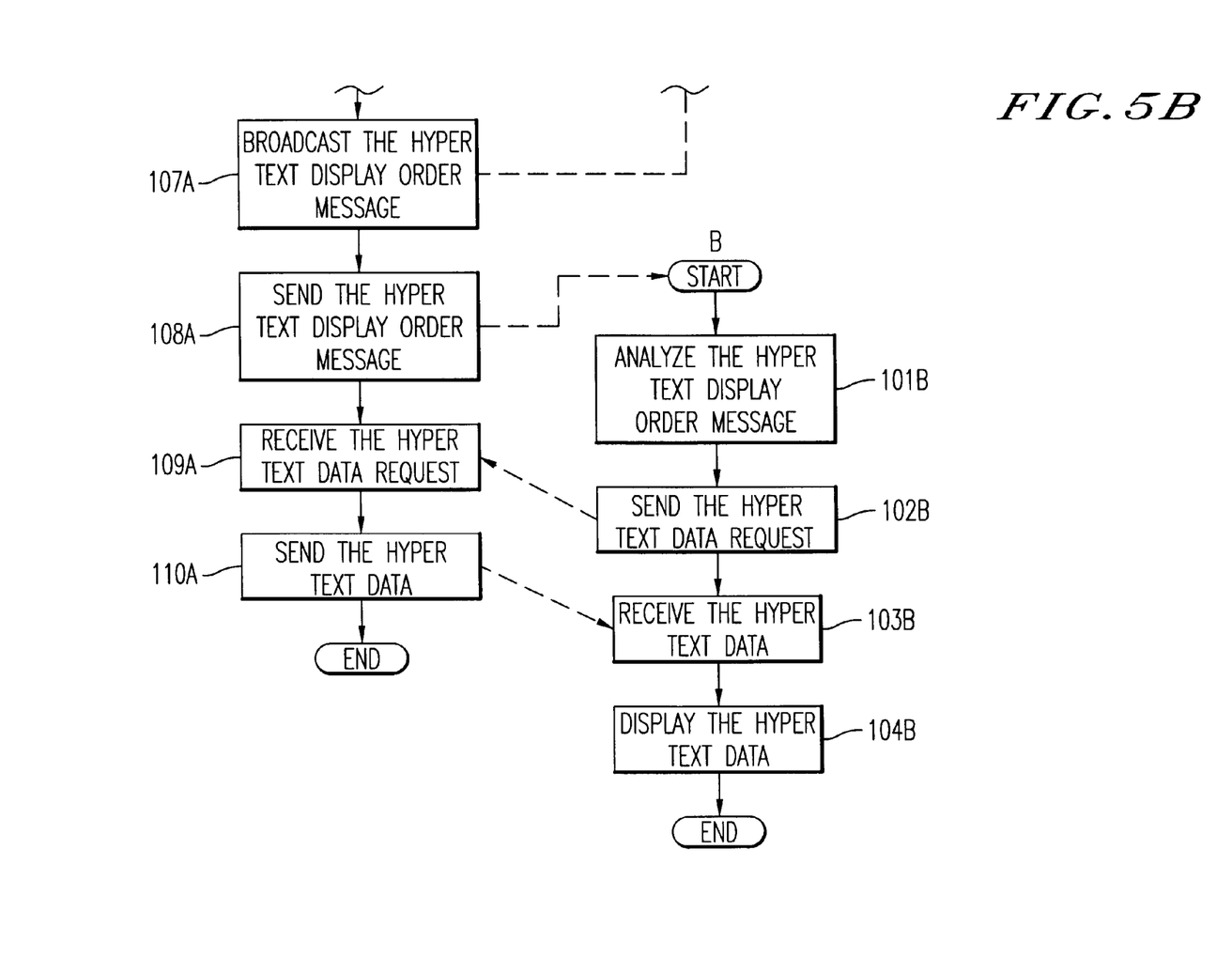
Figure 6A:
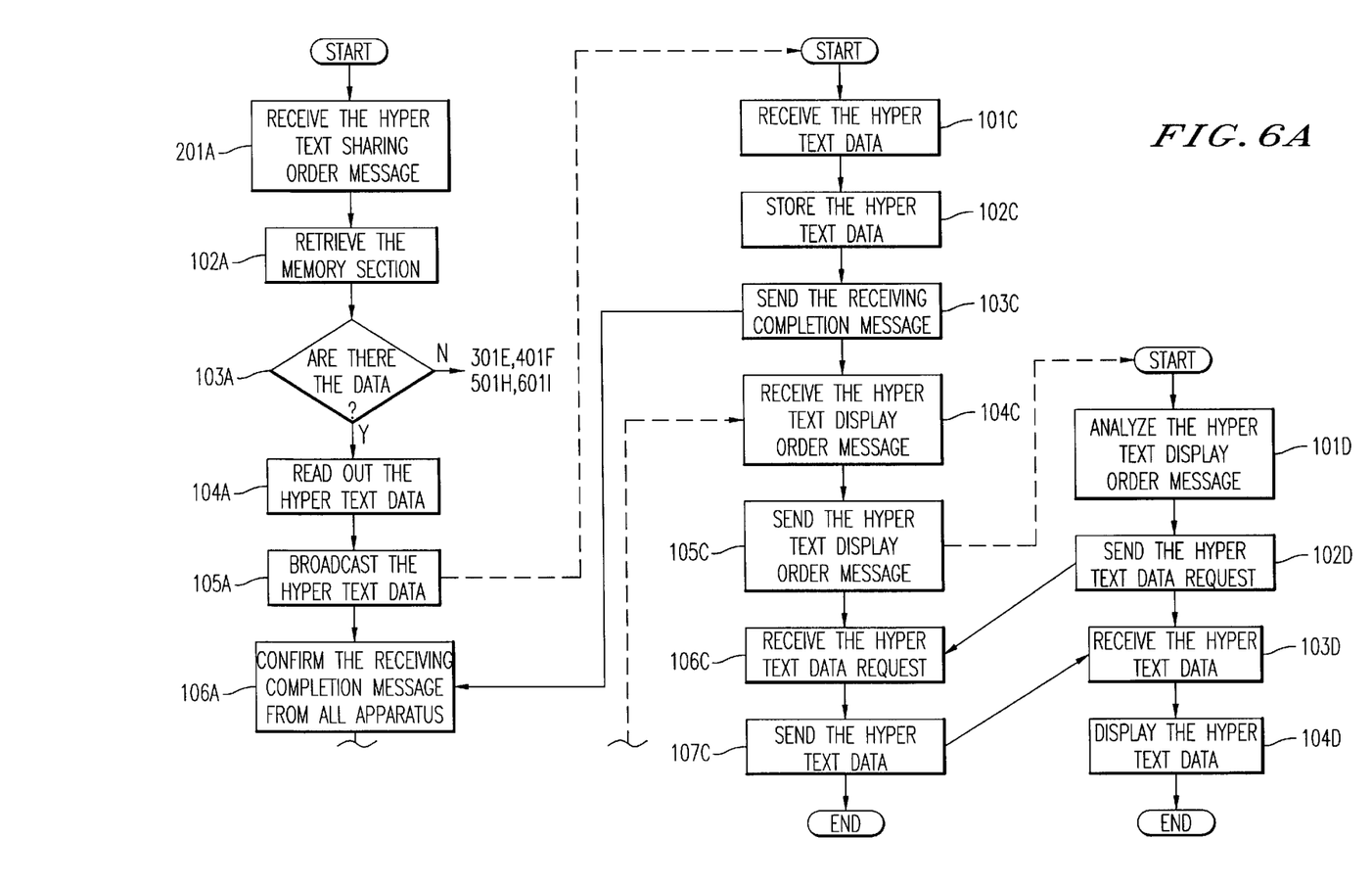
FIG. 6 is a second flow chart of a communication control method according to the first embodiment of the present invention.
Figure 6B:
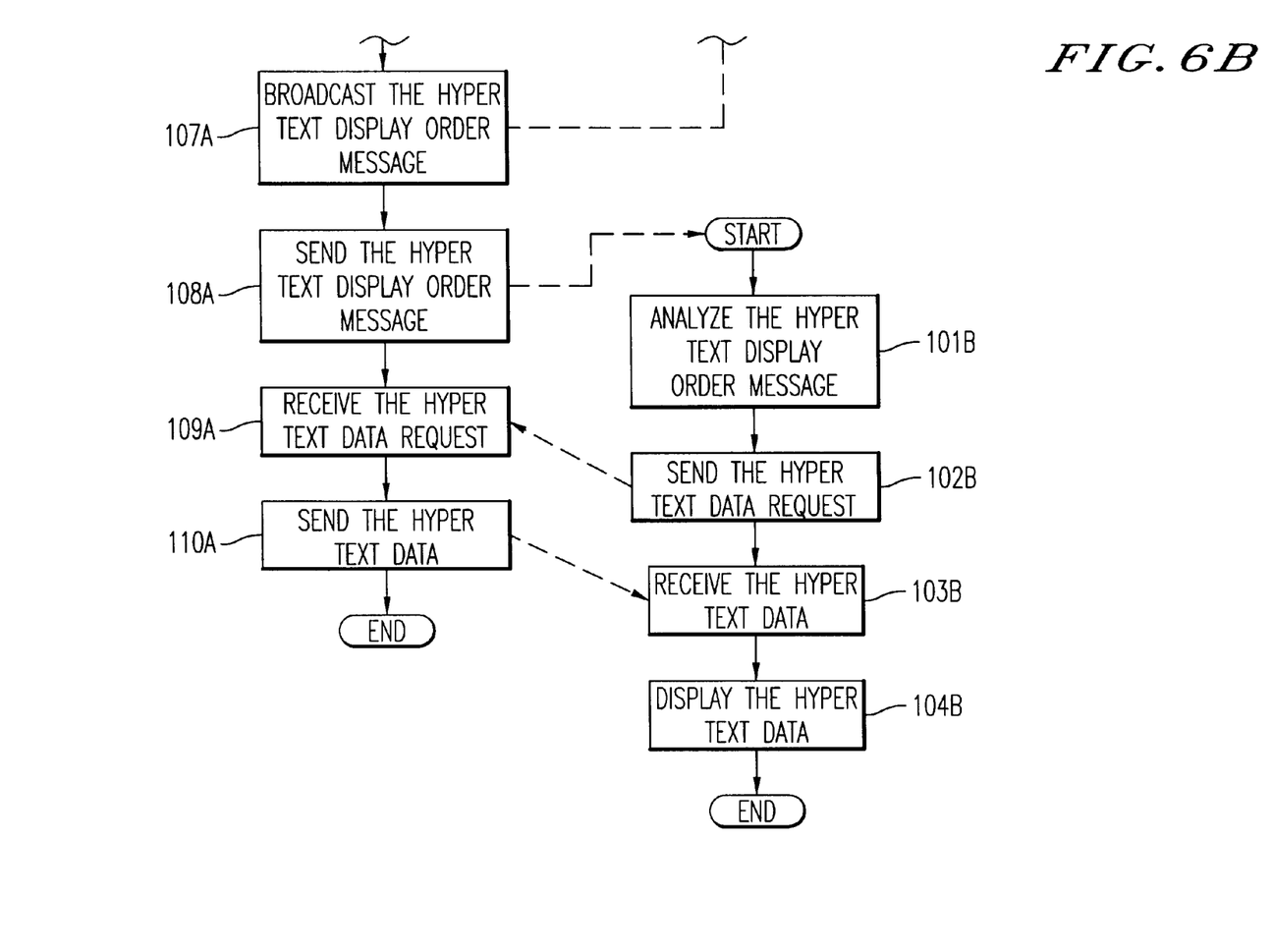

FIG. 5 is a flow chart of a communication control method in case the hypertext identifier and the sharing order is indicated by the input section 11 of the particular terminal 10. FIG. 6 is a flow chart of a communication control method in case the hypertext identifier and the sharing order is indicated by a packet received by the communication section 12. In FIG. 5, a flow chart A is a data sharing process in the particular terminal in which the user indicates the data sharing, a flow chart B is a browser process in the particular terminal, a flow chart C is a data sharing process in other terminal linked by the particular terminal, and a flow chart D is a browser process in the other terminal. First, the data sharing process in the particular terminal receives the hypertext identifier and the hypertext sharing order by the user through the input section 16 (step 101A). In this case, URL is used as the hypertext identifier. The data sharing process retrieves the management table 17 to confirm whether the hypertext of the URL is stored in the memory section 16 (step 102A). The management table 17 stores relation information of correspondence between the memory address and the URL of the hypertext stored in the memory section 16. If the management table 17 stores the memory address corresponding to indicated URL, the hypertext data is read from the memory section 16 by using the memory address (step 104A). A first packet consisting of data sending message, the URL and the hypertext data is created. This packet is broadcasted to other terminals linked by the particular terminal through the communication section 12 (step 105A). After broadcasting the first packet, the data sharing process waits to receive the receiving completion message from the other terminal for a predetermined time and confirms that the receiving completion message is received from all other terminals (step 106A). A second packet consisting of hypertext display order message and the URL is created and broadcast to the other terminals (step 107A). After broadcasting the second packet, a third packet consisting of the hypertext display order message and the URL is created and informed to the browser process in the particular terminal (step 108A). The browser process analyzes the third packet, and detects the hypertext display order message and the URL (step 101B). Then, the browser process sends the hypertext data to the data sharing process (step 102B). When the data sharing process receives the hypertext data request from the browser process (step 109A), the hypertext data of the URL is sent to the browser process (step 110A). When the browser process receives the hypertext (step 103B), the browser process analyzes the hypertext and displays the hypertext data through the display section 18 (step 104B).

Next, the data sharing process of other terminals linked by the particular terminal is explained. When the data sharing process receives the first packet sent by the particular terminal, the data sharing process extracts the data sending message, the URL and the hypertext data. This hypertext data is stored in the memory section of this terminal (step 102C). In this case the memory address with the URL is stored in the management table. The data sharing process creates a packet consisting of a receiving completion message and the URL, and sends the packet to the particular terminal (step 103C). Then, the data sharing process receives the second packet of the hypertext display order message and the URL sent by the particular terminal (step 104C), and extracts the hypertext display order message and the URL from the packet. The data sharing process generates a packet consisting of the hypertext display order and the URL and informs the packet to the browser process in the other terminal (step 105C). Hereafter, the data sharing process receives the hypertext data request from the browser process (step 106C) and sends the hypertext data to the browser process (step 107C). The flowchart D of the browser process (steps 101D–104D) of the other terminal is the same as the flowchart B of the particular terminal.

As mentioned above, the hypertext data of the particular terminal is broadcasted to the other terminal at one time. Therefore, in comparison with the prior method in which each terminal obtains the hypertext data from the server, the time from indicating the sharing to display the hypertext data in each terminal is greatly reduced. Furthermore, the hypertext data is sent to all other terminals linked by the particular terminal. Therefore, even if all other terminals can not access a WWW server, the hypertext data is shared among all other terminals. In steps 105A and 107A of FIG. 5, the hypertext data and the hypertext display order message may be sent from the particular terminal to the other terminal. In this case, the packet is consists of the hypertext data, the URL and the hypertext display order massage.

FIG. 6 is a flow chart of processing in case the hypertext sharing order message is received by the communication section 12 instead of the user's input. In this case, the received packet is analyzed and the hypertext sharing order and the URL are extracted (step 201A). Other steps of FIG. 6 are same as FIG. 5. Accordingly, even if one terminal does not have the hypertext data in memory section, the user of the one terminal sends the hypertext sharing request to another terminal which has the hypertext data. The other terminal can broadcast the hypertext data in response to the hypertext sharing request.

Figure 7A:
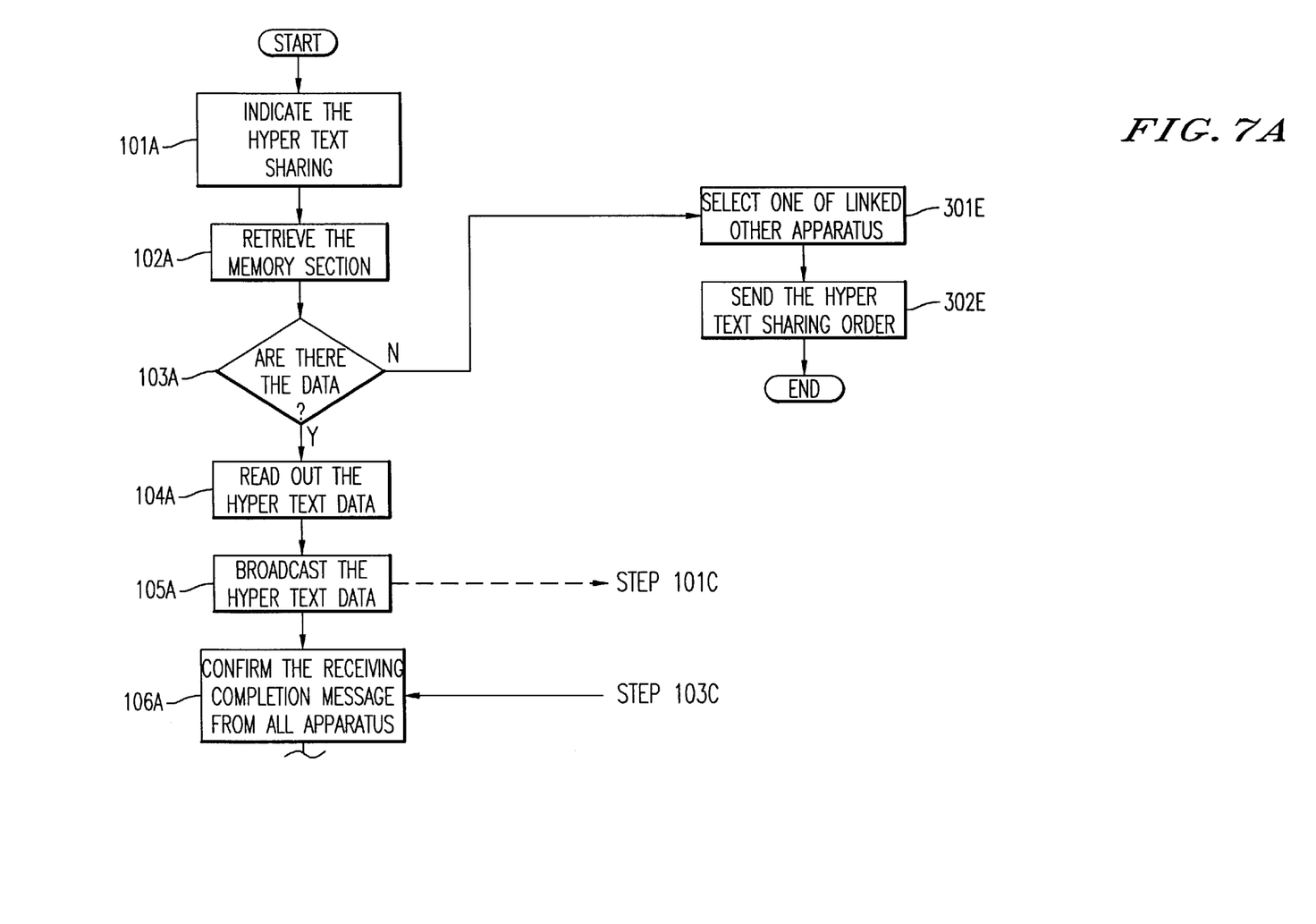
FIG. 7 is a first flow chart of a communication control method according to a second embodiment of the present invention.
Figure 7B:
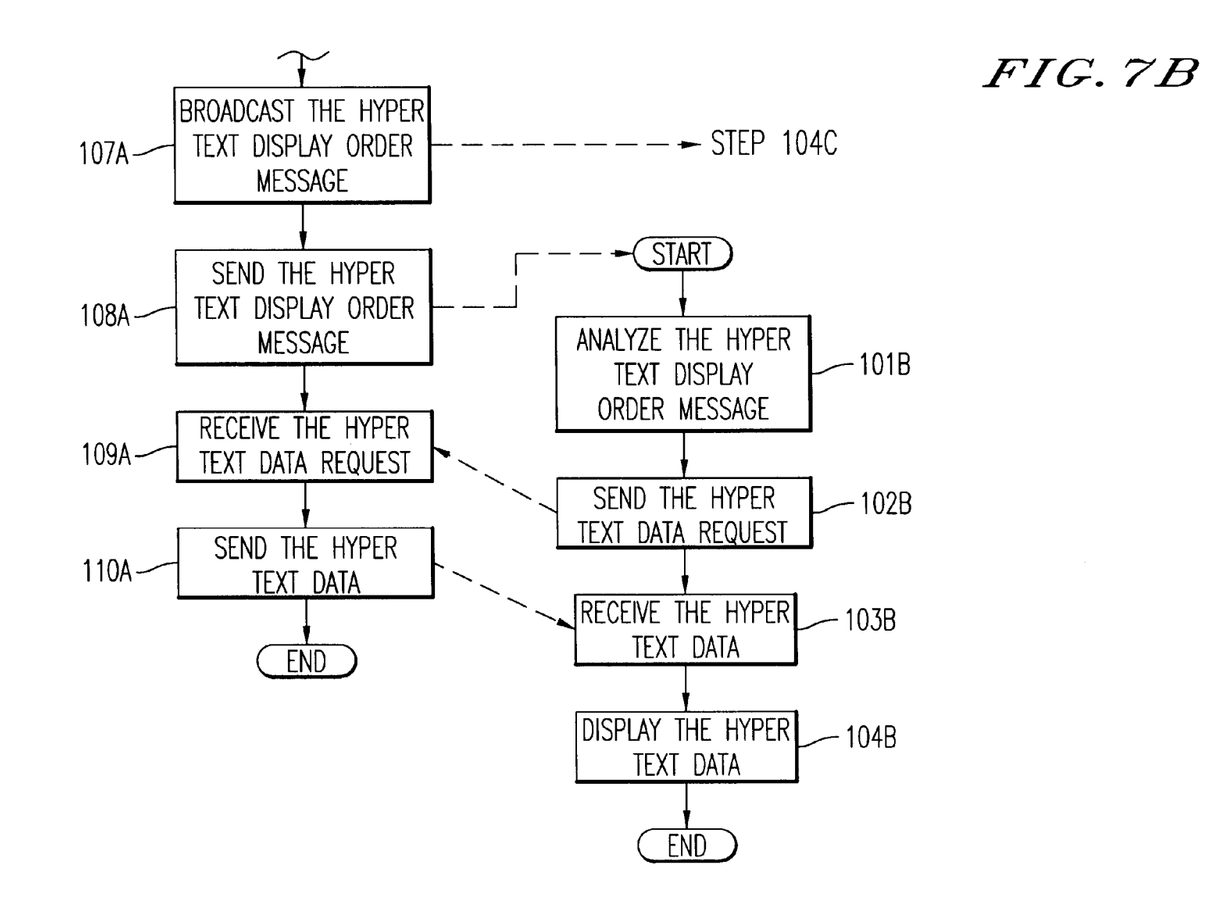
Figure 8A:
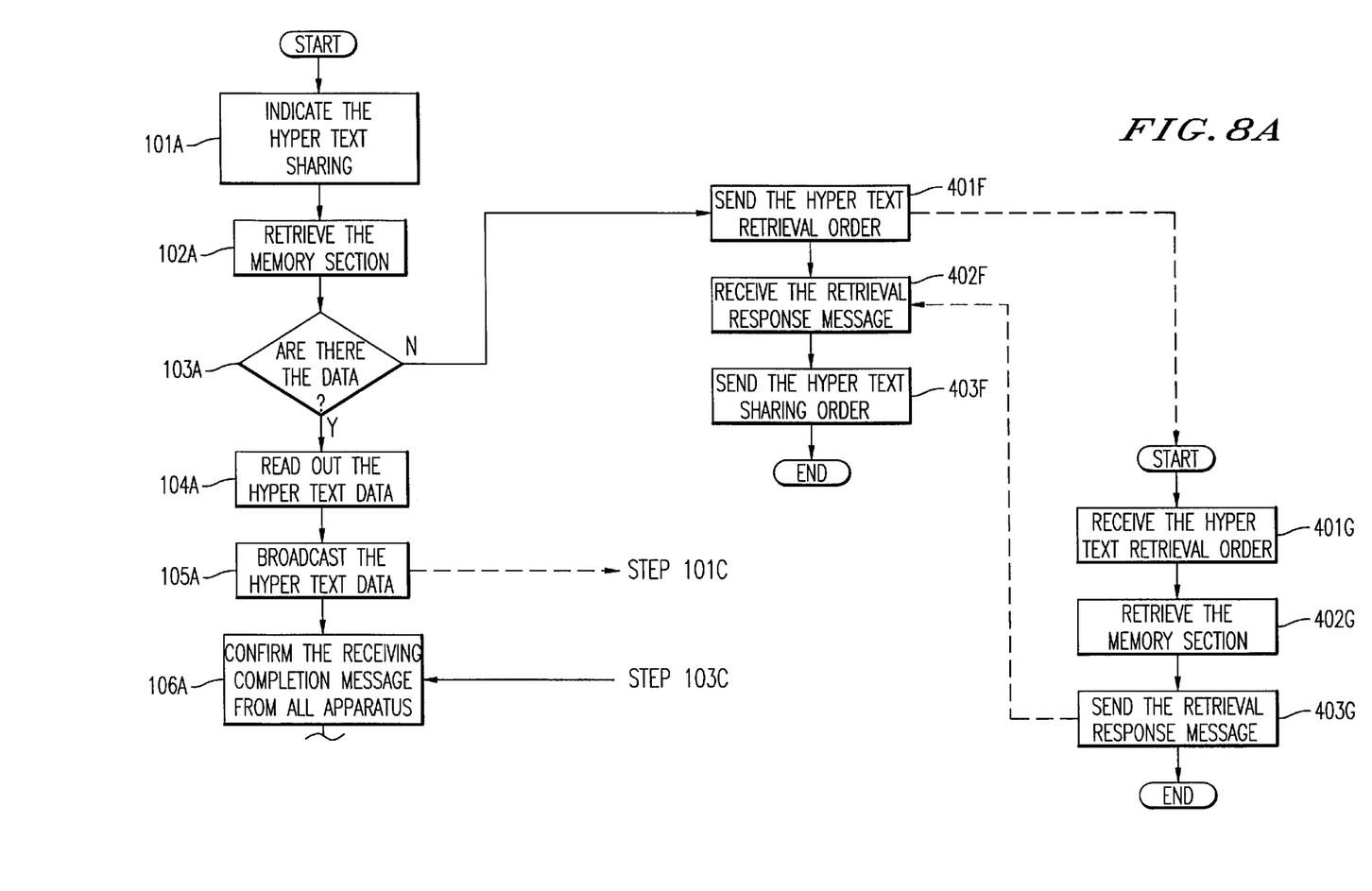
FIG. 8 is a second flow chart of a communication control method according to the second embodiment of the present invention.
Figure 8B:
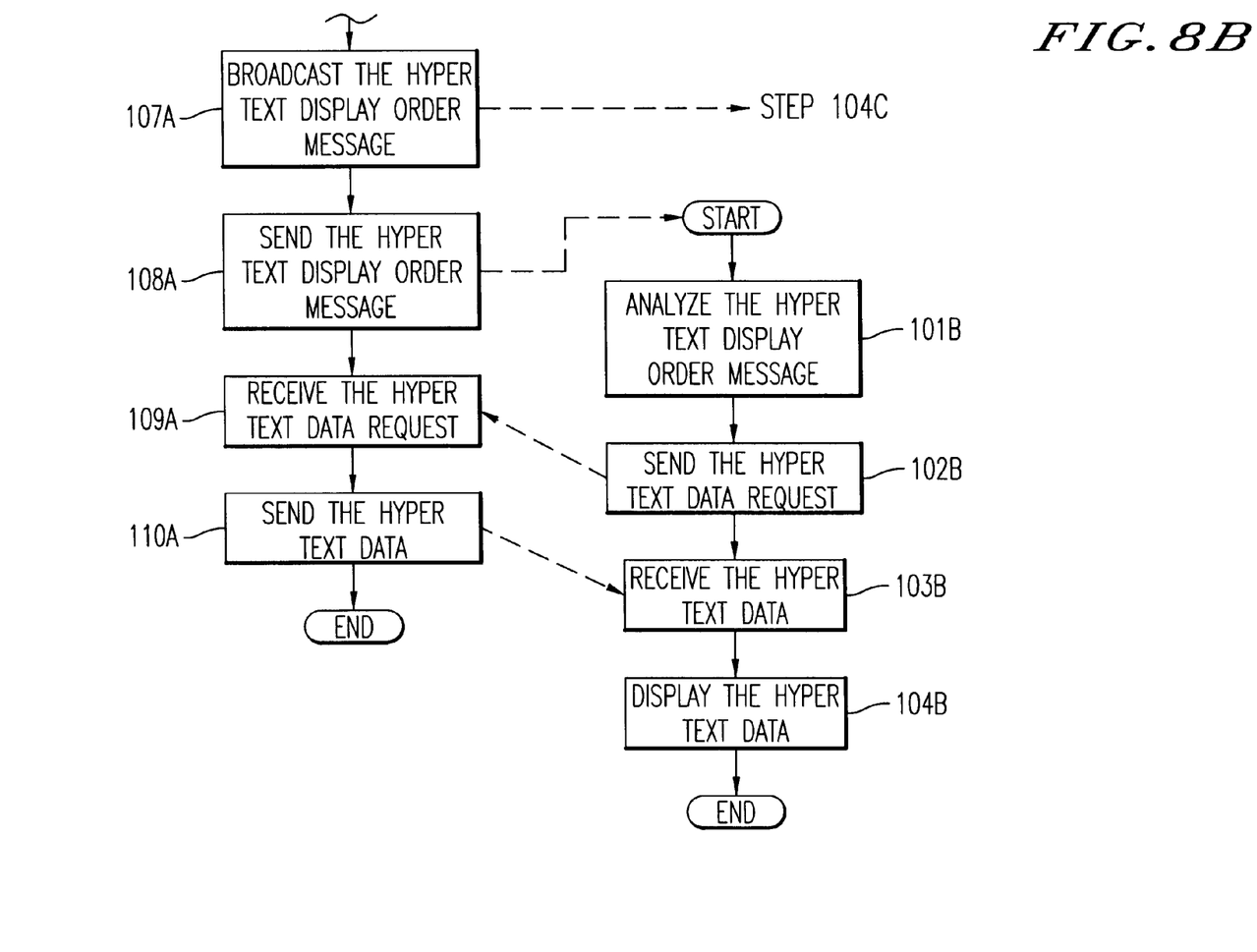

FIGS. 7 and 8 are flow charts of processing of the second embodiment in case the particular terminal does not have the hypertext data when the user inputs the hypertext sharing order through the input section. Only steps of the flow chart which are different from the first embodiment (FIG. 5) are only explained. The hypertext data of the URL is decided to be stored in the memory section 16 (step 102A). If the hypertext data is not stored (step 103A), one other terminal is selected from all other terminals linked by the particular terminal (step 301E). As a method of selection, when the particular terminal received the hypertext data from another terminal before, the URL of the hypertext data with the other terminal identifier is stored in the memory section 16. (If the user wants to watch a sequel of this hypertext data, the user can request for the sequel to the other terminal by using the other terminal identifier.) In this case, the other terminal identifier corresponding to the indicated URL is retrieved from the memory section. A packet consisting of the hypertext sharing order message and the URL is sent to the other terminal of the retrieved identifier (step 302E). When the other terminal receives this packet, the hypertext sharing order message and the URL are extracted from the packet as shown in FIG. 6.

Alternatively, as a second method of selection, the packet consisting of a hypertext retrieval order and the URL is broadcast to all other terminals linked by the particular terminal (step 401F). When each other terminal receives the packet, the retrieval order and the URL are extracted from the packet (step 401G). Each other terminal decides whether the data of the URL is stored in the memory section (step 402G). If the data is stored in the memory section of one other terminal, the one other terminal creates a packet consisting of a retrieval response message and the URL, and sends this packet to the particular terminal (step 403G). If the data is not stored in the memory section, the one other terminal does not execute at all. The particular terminal which sent the retrieval order message waits for the retrieval response message for a predetermined time. When the particular terminal receives the packet from the one other terminal, the retrieval response message and the URL are extracted from the packet (step 402F). If the URL of the received packet coincides with the URL of the retrieval order, the particular terminal sends a packet consisting of the sharing order message and the URL to the one other terminal (step 403F). When the one other terminal receives the packet, the sharing order message and the URL are extracted from the packet. The data sharing process of the one other terminal executes the processing of FIG. 6. In this way, even if the particular terminal does not have the hypertext data indicated by the user in the memory section, the other terminal which has the hypertext data is searched from all other terminals linked by the particular terminal. A sharing of the hypertext is requested for the searched other terminal. In this case, if all other terminals do not have the hypertext data, the particular terminal may send the hypertext retrieval order to the other terminal except for the group (not linked by the particular terminal).

Figure 9A:
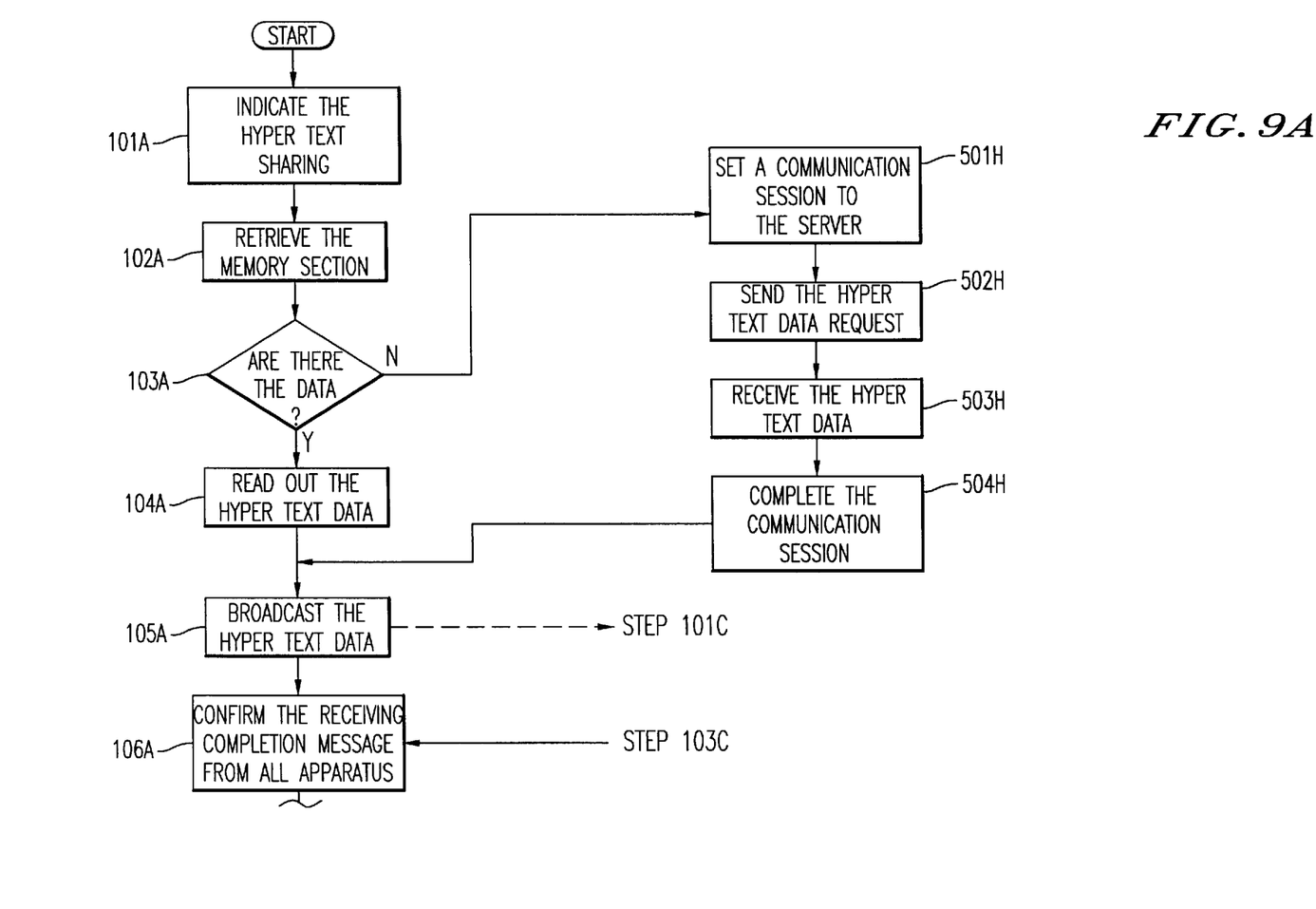
FIG. 9 is a flow chart of a communication control method according to a third embodiment of the present invention.
Figure 9B:
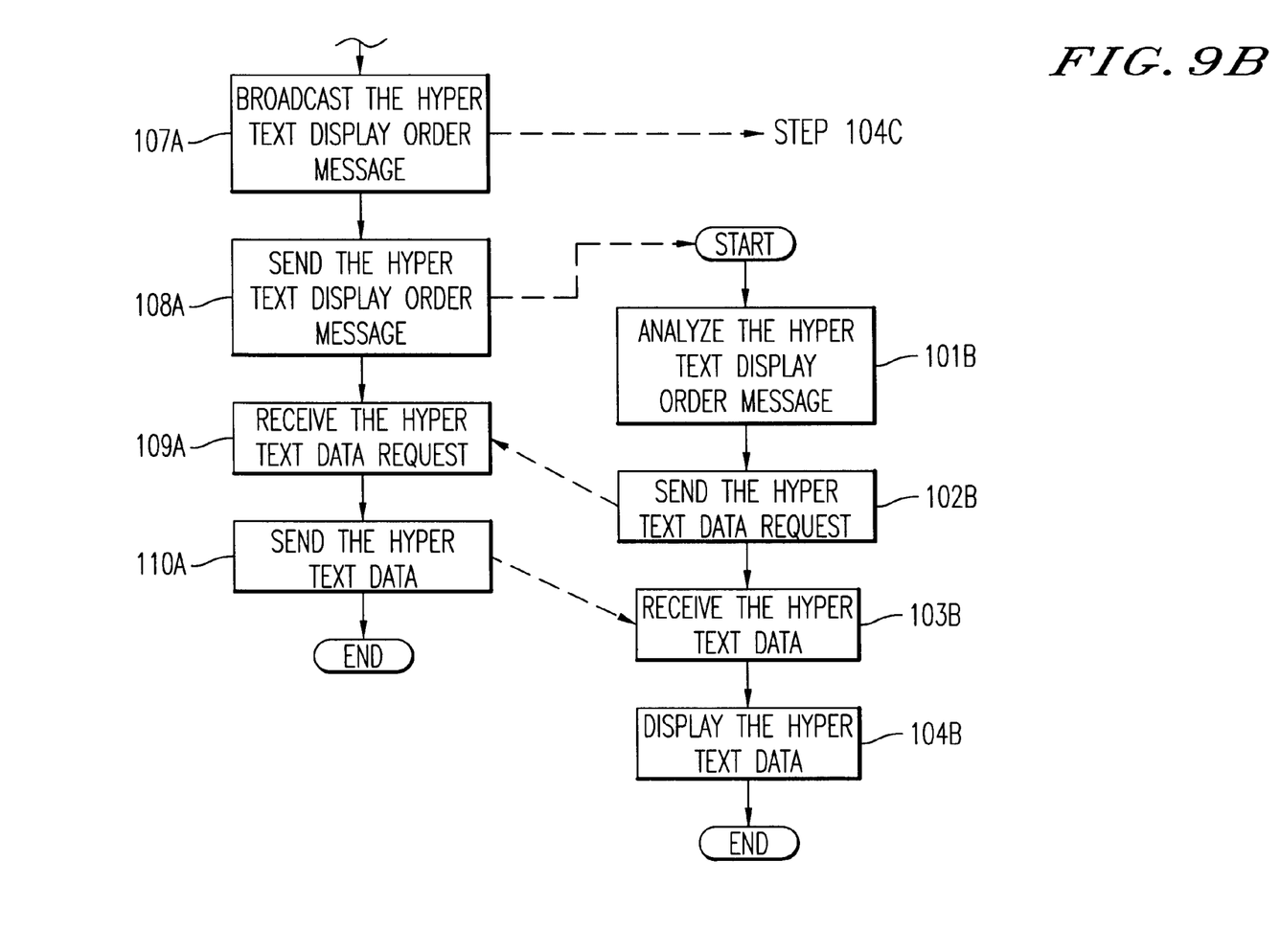

FIG. 9 is a flow chart of processing of the third embodiment in case the particular terminal does not have the hypertext data when the user inputs the hypertext sharing order through the input section. As a specific feature of the third embodiment, if the hypertext data is not stored in the memory section, the browser process of the particular terminal sets a communication session to the server (step 501H), creates a packet consisting of the hypertext data request and the URL, and sends the packet to the server (step 502H). When the browser process of the particular terminal receives the hypertext data from the browser (step 503H), the communication session to the server is completed (step 504H). The received hypertext data is stored in memory section 16, and the memory address and the URL are registered in the management table 17. Hereafter, the particular terminal executes the same processing as shown in FIG. 5.

As mentioned above, even if the hypertext data indicated by the user is not stored in the particular terminal, a communication session is linked to the server and the hypertext data is received from the server through the browser process. Furthermore, if the particular terminal, which does not have the hypertext data, receives the hypertext sharing order from other terminal, the communication session is linked to the server to obtain the hypertext data. In this case, only one terminal (particular terminal) accesses the server and a load to the server is reduced. Data transmission is only two times, one for obtaining data from the server and one for a broadcasting to other terminals. Therefore, in comparison with the prior art, data transmission time is also reduced.

Figure 10A:
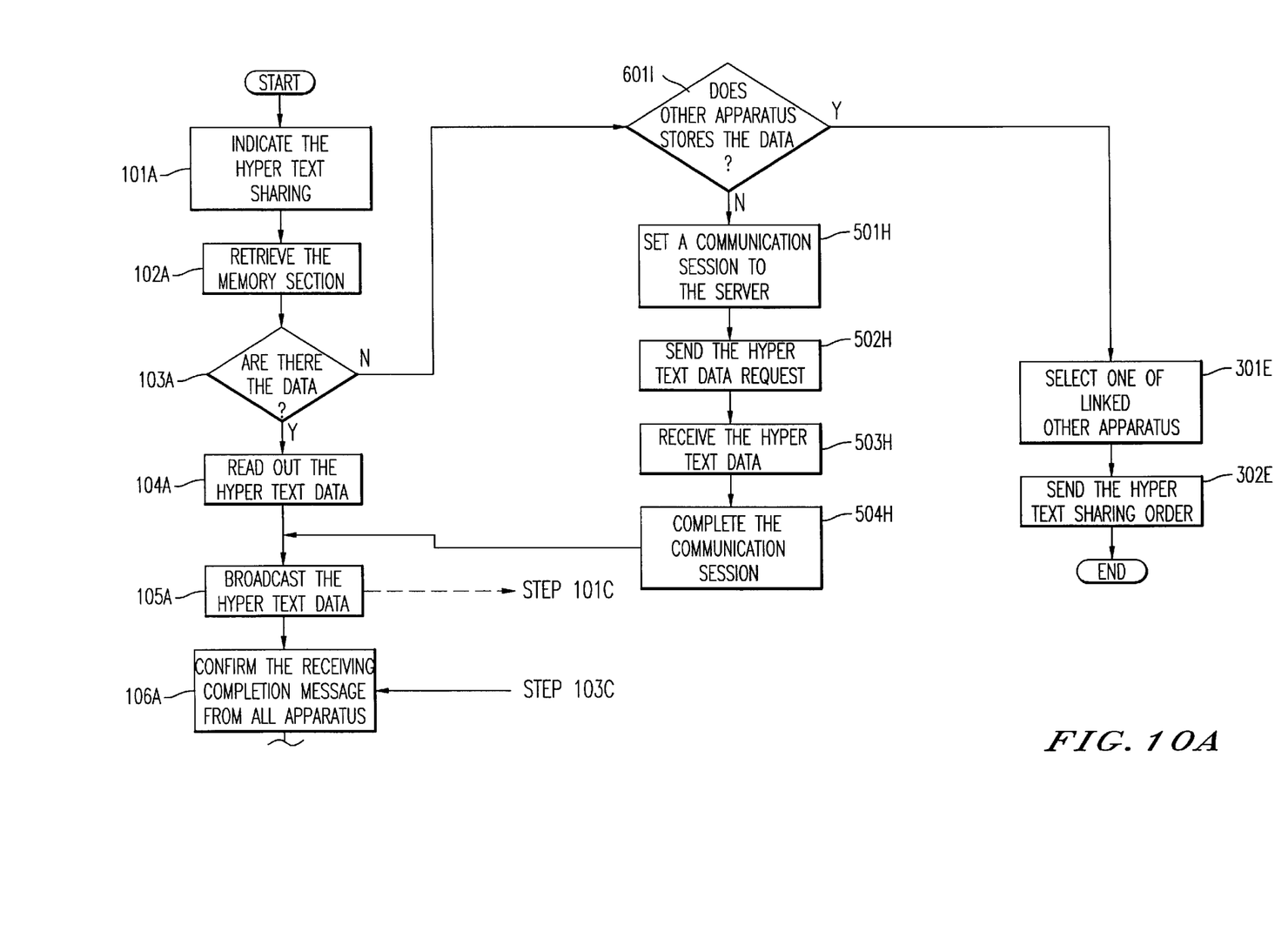
FIG. 10 is a flow chart of a communication control method according to a fourth embodiment of the present invention.
Figure 10B:
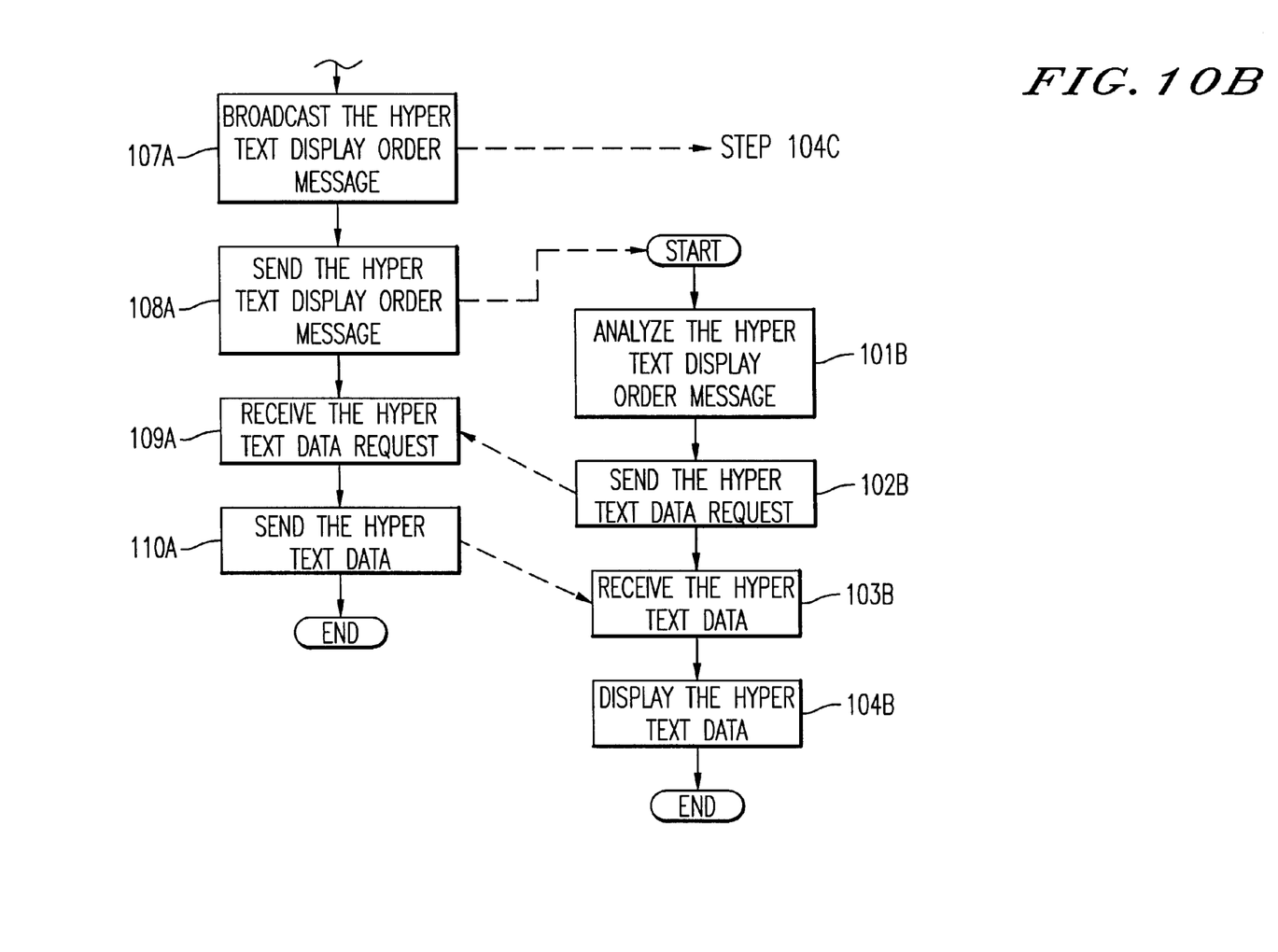

FIG. 10 is a flow chart of processing of the fourth embodiment. A specific feature of the fourth embodiment is a combination of the second embodiment and the third embodiment. In short, if the particular terminal does not have the hypertext data indicated by the user, the particular terminal decides whether a linked other terminal has the hypertext data (step 601I). If at least one of the other terminals has the hypertext data, steps 301E, and 301F are executed in the same way as in the second embodiment. If all other terminals do not have the hypertext data, steps 501H–504H are executed in same way as in the third embodiment.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A communication control apparatus, a plurality of the communication control apparatuses forming a group of member terminals, data being shared and displayed among the plurality of the communication control apparatuses of the group, each one of the plurality of the communication control apparatuses comprising:

memory means for storing at least one data and its discrimination information;

input means for inputting the discrimination information of data to broadcast to other communication control apparatuses of the group;

retrieval means for retrieving the data corresponding to the discrimination information from said memory means;

sending means for broadcasting the retrieved data to the other communication control apparatuses of the group as shared data;

receiving means for receiving data broadcasted by the other communication control apparatuses of the group, wherein said sending means broadcasts the discrimination information and a display order message of the shared data to the other communication control apparatuses of the group as a common working indication after the shared data is broadcasted; and selection means for selecting one other communication control apparatus of the group which stores the data to broadcast if the data to broadcast is not stored in said memory means, wherein said sending means sends the discrimination information of data to broadcast and a sharing order message to the selected other communication control apparatus.

2. The communication control apparatus according to claim 1,
wherein said sending means simultaneously broadcasts the shared data, the discrimination information and the display order message to the other communication control apparatuses of the group.

3. The communication control apparatus according to claim 1,
wherein said receiving means receives the discrimination information of data to broadcast sent by other communication control apparatus of the group instead of inputting the discrimination information.

4. The communication control apparatus according to claim 1,
wherein said sending means sends a retrieval order message of data to broadcast to other communication control apparatuses of the group if the data to broadcast is not stored in said memory means.

5. The communication control apparatus according to claim 4,
wherein said sending means sends a sharing order message of data to broadcast to one other communication control apparatus of the group if said receiving means receives a retrieval response message of the data to broadcast from the one other communication control apparatus.

6. The communication control apparatus according to claim 5,
wherein said sending means sends the retrieval order message of data to broadcast to other communication control apparatus except for the group if said receiving means does not receive the retrieval response message from all other communication control apparatuses of the group.

7. The communication control apparatus according to claim 1, wherein said sending means sends a data request to a server by setting a communication session to the server if the data to broadcast is not stored in all communication control apparatuses of the group.

8. The communication control apparatus according to claim 1, wherein said selection means selects the one other communication control apparatus of the group if at least one other communication control apparatus of the group stores the data to broadcast.

9. A communication control method in an apparatus, a plurality of the apparatuses forming a group of member terminals, data being shared and displayed among the plurality of the apparatuses of the group, the method comprising the steps of:

storing at least one data and its discrimination information;

inputting the discrimination information of data to broadcast to other apparatuses of the group;

retrieving the data corresponding to the discrimination information from stored data;

broadcasting the retrieved data to the other apparatuses of the group as shared data;

receiving data broadcasted by other apparatus of the group;

broadcasting the discrimination information and a display order message of the shared data to the other apparatuses of the group as a common working indication after the shared data is broadcasted;

selecting one other communication control apparatus of the group which stores the data to broadcast if the data to broadcast is not stored; and sending the discrimination information of data to broadcast and a sharing order message to the selected other communication control apparatus.

10. A computer readable memory containing computer readable instructions for an apparatus, a plurality of the apparatuses forming a group of member terminals, data being shared and displayed among the plurality of the apparatuses of the group, comprising:

instruction means for causing a computer to store at least one data and its discrimination information;

instruction means for causing a computer to input the discrimination information of data to broadcast to other apparatuses of the group;

instruction means for causing a Computer to retrieve the data corresponding to the discrimination information from stored data;

instruction means for causing a computer to broadcast the retrieved data to the other apparatuses of the group as shared data;

instruction means for causing a computer to receive data broadcasted by other apparatus of the group;

instruction means for causing a computer to broadcast the discrimination information and a display order message of the shared data to the other apparatuses of the group as a common working indication after the shared data is broadcasted;

instruction means for causing a computer to select one other communication control apparatus of the group which stores the data to broadcast if the data to broadcast is not stored; and instruction means for causing a computer to send the discrimination information of data to broadcast and a sharing order message to the selected other communication control apparatus.

* * * * *